US012775919B2

(12) United States Patent
Franklin et al.

(10) Patent No.: US 12,775,919 B2
(45) Date of Patent: Oct. 27, 2026

(54) REJECTION OF IMPERMISSIBLE DOCUMENTS

(71) Applicant: Capital One Services, LLC, McLean, VA (US)

(72) Inventors: Keegan Franklin, Tucson, AZ (US); James Brighter, Reston, VA (US); Megan Obrien, New Orleans, LA (US); John Maillett, Arlington, VA (US); Jane Justiz, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 204 days.

(21) Appl. No.: 18/584,393

(22) Filed: Feb. 22, 2024

(65) Prior Publication Data

US 2025/0272666 A1 Aug. 28, 2025

(51) Int. Cl.
*G06K 9/00* (2022.01)
*G06Q 20/04* (2012.01)
(Continued)

(52) U.S. Cl.
CPC ......... *G06Q 20/042* (2013.01); *G06Q 20/108* (2013.01); *G06Q 20/3223* (2013.01); *G06V 30/10* (2022.01); *G06V 30/40* (2022.01)

(58) Field of Classification Search
CPC ............... G06Q 20/042; G06Q 20/108; G06Q 20/3223; G06Q 40/02; G06V 30/10; G06V 30/40; G06V 30/142
See application file for complete search history.

(56) References Cited

U.S. PATENT DOCUMENTS

| | | | |
|---|---|---|---|
| 5,515,451 | A | 5/1996 | Tsuji et al. |
| 7,391,934 | B2 | 6/2008 | Goodall et al. |

(Continued)

FOREIGN PATENT DOCUMENTS

| | | | |
|---|---|---|---|
| JP | 2020021419 | A | 2/2020 |
| KR | 2570769 | B1 | 8/2023 |

OTHER PUBLICATIONS

Abraham, "Moire Pattern Detection using Wavelet Decomposition and Convolutional Neural Network," Amadeus Software Labs Pvt. Ltd, IEEE (2018).

(Continued)

*Primary Examiner* — Shervin K Nakhjavan
(74) *Attorney, Agent, or Firm* — Sterne, Kessler, Goldstein & Fox P.L.L.C.

(57) ABSTRACT

A computer implemented method, system and non-transitory computer-readable device for a remote deposit environment activating, on a client device, a financial application, wherein the financial application is configured to instantiate a customer interface (UI) on the client device. Upon receiving a customer request, based on interactions with the UI, the method implements an electronic deposit of a financial instrument by generating a live stream of image data of a field of view of at least one camera, wherein the live stream of image data includes imagery of at least a portion of the financial instrument, determining, based on the live stream of image data and a machine learning model (ML), an impermissibility score of the financial instrument and, based on exceeding a selectable threshold of the impermissibility score, modifying a status of the remote deposit to pause or terminate the remote deposit.

20 Claims, 8 Drawing Sheets

(51) Int. Cl.

| | |
|---|---|
| ***G06Q 20/10*** | (2012.01) |
| ***G06Q 20/32*** | (2012.01) |
| ***G06V 30/10*** | (2022.01) |
| ***G06V 30/40*** | (2022.01) |

(56) References Cited

U.S. PATENT DOCUMENTS

| | | | | |
|---|---|---|---|---|
| 7,421,107 | B2 | 9/2008 | Lugg | |
| 7,526,117 | B2 | 4/2009 | Foth et al. | |
| 7,587,066 | B2 | 9/2009 | Cordery et al. | |
| 7,698,222 | B1 | 4/2010 | Bueche | |
| 7,702,588 | B2 | 4/2010 | Gilder et al. | |
| 7,734,545 | B1 | 6/2010 | Fogliano et al. | |
| 7,818,307 | B1 | 10/2010 | Young et al. | |
| 7,856,402 | B1 | 12/2010 | Kay | |
| 7,905,396 | B2 | 3/2011 | Tidwell et al. | |
| 7,949,587 | B1 | 5/2011 | Morris et al. | |
| 8,027,928 | B1 | 9/2011 | Hecht, Jr. et al. | |
| 8,050,997 | B1 | 11/2011 | Nosek et al. | |
| 8,060,442 | B1 | 11/2011 | Hecht et al. | |
| 8,104,676 | B2 | 1/2012 | Ramachandran | |
| 8,213,782 | B2 | 7/2012 | Jelinek | |
| 8,271,381 | B2 | 9/2012 | O'Brien et al. | |
| 8,290,876 | B1 | 10/2012 | Powell | |
| 8,296,230 | B2 | 10/2012 | Davis et al. | |
| 8,300,917 | B2 | 10/2012 | Borgia et al. | |
| 8,332,329 | B1 | 12/2012 | Thiele | |
| 8,406,500 | B2 | 3/2013 | Najari et al. | |
| 8,464,933 | B1 | 6/2013 | Prasad et al. | |
| 8,532,419 | B2 | 9/2013 | Coleman | |
| 8,559,766 | B2 | 10/2013 | Tilt et al. | |
| 8,582,862 | B2 | 11/2013 | Nepomniachtchi et al. | |
| 8,605,982 | B2 | 12/2013 | Jackson et al. | |
| 8,626,661 | B2 | 1/2014 | Gilder | |
| 8,632,001 | B1 | 1/2014 | Ramachandran et al. | |
| 8,638,363 | B2 | 1/2014 | King et al. | |
| 8,639,105 | B2 | 1/2014 | Ogino | |
| 8,708,227 | B1 | 4/2014 | Oakes, III et al. | |
| 8,745,073 | B2 | 6/2014 | Mulligan et al. | |
| 8,811,711 | B2 | 8/2014 | Calman et al. | |
| 8,885,963 | B2 | 11/2014 | Coleman | |
| 8,958,605 | B2 | 2/2015 | Amtrup et al. | |
| 8,959,033 | B1 | 2/2015 | Oakes, III et al. | |
| 8,983,170 | B2 | 3/2015 | Nepomniachtchi et al. | |
| 8,995,012 | B2 | 3/2015 | Heit et al. | |
| 9,064,248 | B2 | 6/2015 | Huff et al. | |
| 9,307,206 | B2 | 4/2016 | Tilt | |
| 9,324,073 | B2 | 4/2016 | Nepomniachtchi et al. | |
| 9,384,392 | B2 | 7/2016 | Weber et al. | |
| 9,483,761 | B2 | 11/2016 | Brendell et al. | |
| 9,558,493 | B2 | 1/2017 | Carrott | |
| 9,569,756 | B1 | 2/2017 | Bueche, Jr. et al. | |
| 9,640,041 | B2 | 5/2017 | Block et al. | |
| 9,652,690 | B2 | 5/2017 | Eid et al. | |
| 9,661,216 | B2 | 5/2017 | Tilt | |
| 9,672,510 | B2 | 6/2017 | Roach et al. | |
| 9,679,281 | B2 | 6/2017 | Moshal | |
| 9,684,920 | B2 | 6/2017 | Kalgi et al. | |
| 9,721,177 | B2 | 8/2017 | Lee et al. | |
| 9,747,509 | B2 | 8/2017 | Eid et al. | |
| 9,779,392 | B1 | 10/2017 | Prasad et al. | |
| 9,807,263 | B2 | 10/2017 | Bala et al. | |
| 9,852,406 | B2 | 12/2017 | Doyle et al. | |
| 9,852,409 | B2 | 12/2017 | Artman et al. | |
| 10,026,119 | B2 | 7/2018 | Green et al. | |
| 10,192,108 | B2 | 1/2019 | Nepomniachtchi et al. | |
| 10,210,522 | B1 | 2/2019 | Medina, III et al. | |
| 10,217,375 | B2 | 2/2019 | Waldron et al. | |
| 10,402,790 | B1 | 9/2019 | Clark et al. | |
| 10,460,381 | B1 | 10/2019 | Pollack et al. | |
| 10,504,185 | B1 | 12/2019 | Buentello | |
| 10,552,810 | B1 | 2/2020 | Ethington et al. | |
| 10,635,898 | B1 | 4/2020 | Pribble et al. | |
| 10,692,230 | B2 | 6/2020 | Anderson et al. | |
| 10,699,146 | B2 | 6/2020 | Shustorovich et al. | |
| 10,706,466 | B1 * | 7/2020 | Ethington | G06T 7/12 |
| 10,762,579 | B2 | 9/2020 | Riechers et al. | |
| 10,769,598 | B1 | 9/2020 | Oakes, III et al. | |
| 10,789,496 | B2 | 9/2020 | Kotovich et al. | |
| 10,817,997 | B2 * | 10/2020 | Dewitt | G06F 16/583 |
| 10,853,771 | B2 | 12/2020 | Enobakhare | |
| 10,855,914 | B1 | 12/2020 | Prasad et al. | |
| 10,909,362 | B2 | 2/2021 | Nepomniachtchi et al. | |
| 10,915,879 | B1 * | 2/2021 | Pollack | H04N 1/38 |
| 11,064,111 | B1 | 7/2021 | Prasad et al. | |
| 11,068,867 | B1 | 7/2021 | Tucker | |
| 11,126,975 | B2 | 9/2021 | Haldenby et al. | |
| 11,127,008 | B1 | 9/2021 | Buentello et al. | |
| 11,145,169 | B2 | 10/2021 | Pratten et al. | |
| 11,157,731 | B2 | 10/2021 | Nepomniachtchi et al. | |
| 11,159,733 | B2 | 10/2021 | Mukul | |
| 11,200,550 | B1 | 12/2021 | Singfield | |
| 11,210,379 | B1 | 12/2021 | Lindley et al. | |
| 11,216,884 | B1 | 1/2022 | Buentello | |
| 11,222,313 | B2 | 1/2022 | Doyle et al. | |
| 11,244,302 | B2 | 2/2022 | Ekpenyong et al. | |
| 11,244,319 | B2 | 2/2022 | Navarro et al. | |
| 11,282,086 | B1 | 3/2022 | Medina, III et al. | |
| 11,288,661 | B2 | 3/2022 | Hammad et al. | |
| 11,295,377 | B1 | 4/2022 | Ethington et al. | |
| 11,295,378 | B1 | 4/2022 | Voutour et al. | |
| 11,315,217 | B2 | 4/2022 | Ilic et al. | |
| 11,321,709 | B1 | 5/2022 | Kolchin | |
| 11,373,150 | B1 | 6/2022 | Bueche, Jr. et al. | |
| 11,449,841 | B1 | 9/2022 | Srinivasarangan et al. | |
| 11,516,383 | B2 | 11/2022 | Ilic et al. | |
| 11,531,973 | B1 | 12/2022 | Prasad et al. | |
| 11,539,848 | B2 | 12/2022 | Roach et al. | |
| 11,562,332 | B1 | 1/2023 | Oakes, III et al. | |
| 11,610,294 | B2 | 3/2023 | Dewitt et al. | |
| 11,640,627 | B2 | 5/2023 | Fotso et al. | |
| 11,676,285 | B1 | 6/2023 | Backlund et al. | |
| 11,682,222 | B1 | 6/2023 | Oakes, III et al. | |
| 11,694,268 | B1 | 7/2023 | Buentello | |
| 11,704,627 | B2 | 7/2023 | Gordon et al. | |
| 11,710,210 | B1 | 7/2023 | Medina, III | |
| 11,756,147 | B1 * | 9/2023 | Smith | G06T 1/0021 705/45 |
| 11,798,253 | B2 | 10/2023 | Pribble et al. | |
| 11,810,382 | B2 | 11/2023 | Laza et al. | |
| 11,829,962 | B2 | 11/2023 | Burnam et al. | |
| 11,900,755 | B1 * | 2/2024 | Bueche, Jr. | G06T 7/194 |
| 12,039,504 | B1 * | 7/2024 | Foster | G06Q 20/0425 |
| 12,062,088 | B1 | 8/2024 | Medina et al. | |
| 12,260,700 | B1 | 3/2025 | Bueche, Jr. | |
| 12,347,221 | B1 | 7/2025 | Sureka et al. | |
| 12,437,274 | B2 * | 10/2025 | Hecht | G06V 10/44 |
| 12,511,697 | B2 * | 12/2025 | Vudathu | G06Q 20/042 |
| 12,619,990 | B2 * | 5/2026 | Kolchin | G06Q 20/027 |
| 2005/0283444 | A1 | 12/2005 | Ekberg | |
| 2006/0036537 | A1 | 2/2006 | Lawrence et al. | |
| 2008/0140579 | A1 | 6/2008 | Agarwal | |
| 2009/0171839 | A1 | 7/2009 | Rosano et al. | |
| 2012/0040717 | A1 | 2/2012 | Levy et al. | |
| 2013/0013491 | A1 | 1/2013 | Selway et al. | |
| 2013/0054461 | A1 | 2/2013 | Gupta et al. | |
| 2013/0176473 | A1 | 7/2013 | Ogino | |
| 2013/0198069 | A1 | 8/2013 | Latimer | |
| 2013/0204783 | A1 | 8/2013 | Klose et al. | |
| 2014/0037182 | A1 * | 2/2014 | Williams | G06Q 20/042 382/137 |
| 2014/0074697 | A1 | 3/2014 | Foster | |
| 2014/0114852 | A1 | 4/2014 | Rajagopal et al. | |
| 2014/0122332 | A1 | 5/2014 | Viera et al. | |
| 2014/0236767 | A1 | 8/2014 | Duggal et al. | |
| 2015/0032626 | A1 | 1/2015 | Dill et al. | |
| 2015/0120564 | A1 | 4/2015 | Smith et al. | |
| 2017/0270508 | A1 | 9/2017 | Roach et al. | |
| 2017/0309108 | A1 | 10/2017 | Sadovsky et al. | |
| 2017/0336511 | A1 | 11/2017 | Nerurkar | |
| 2018/0234472 | A1 | 8/2018 | Malakar | |
| 2020/0042955 | A1 | 2/2020 | Widdows | |
| 2020/0160286 | A1 * | 5/2020 | Vukich | G06Q 20/042 |
| 2020/0334647 | A1 | 10/2020 | Malhotra et al. | |

(56) References Cited

U.S. PATENT DOCUMENTS

| | | | | |
|---|---|---|---|---|
| 2020/0389600 | A1 | 12/2020 | Capurso et al. | |
| 2021/0090086 | A1 | 3/2021 | Kriegsfeld et al. | |
| 2021/0174361 | A1 | 6/2021 | Potireddy et al. | |
| 2021/0360149 | A1 | 11/2021 | Mukul | |
| 2022/0245985 | A1 | 8/2022 | Bhutani et al. | |
| 2022/0277291 | A1 | 9/2022 | Roongta et al. | |
| 2022/0335393 | A1 | 10/2022 | Gupta et al. | |
| 2022/0343301 | A1 | 10/2022 | Edwards et al. | |
| 2022/0358575 | A1 | 11/2022 | Smith | |
| 2023/0060395 | A1 | 3/2023 | Roach et al. | |
| 2023/0060464 | A1 | 3/2023 | Ceesay | |
| 2023/0084370 | A1 | 3/2023 | Bradford | |
| 2023/0120865 | A1 | 4/2023 | Nascimento et al. | |
| 2023/0133158 | A1 | 5/2023 | Kolchin | |
| 2023/0196319 | A1 | 6/2023 | Ng et al. | |
| 2023/0196706 | A1 | 6/2023 | Scott | |
| 2023/0209116 | A1 | 6/2023 | Leung et al. | |
| 2023/0281629 | A1 | 9/2023 | Shevyrev et al. | |
| 2023/0289808 | A1 | 9/2023 | Kolchin | |
| 2023/0351782 | A1 | 11/2023 | Fitzgerald | |
| 2024/0193556 | A1* | 6/2024 | Joseph | G06Q 20/042 |
| 2024/0338935 | A1* | 10/2024 | Pedone | G06V 10/20 |
| 2024/0378589 | A1 | 11/2024 | Kolchin | |
| 2025/0259153 | A1* | 8/2025 | Yoshida | G06N 3/045 |

OTHER PUBLICATIONS

Yang, et al., "Doing More with Moire Pattern Detection in Digital Photos," Journal of Latex Class Files, vol. 14, No. 8 (Aug. 2021).
Digital Check, "Money Orders Giving You Trouble? We've Got the Solution!" Oct. 1, 2008. Located via Google Web, available at https://www.digitalcheck.com/moneyorders-dcom/.
Rose, Lydia M. "Modernizing check fraud detection with machine learning." PhD dissertation. Utica College. 2018.
remotedepositcapture.com, "Ensenta Business Mobile with Multi-Check", Available from the Internet at https://www.remotedepositcapture.com/RDC/media/RDC-Forum/Submitted-Sponsor-Brochures/EnsentaBusinessMobileMultiCheck-e-_2018_2_14_12_52_3.pdf, [site visited on May 19, 2023], pp. 1-2.
Bills, Steve, "Automated Amount Scanning Is Trend in Remote-Deposit," American Banker, New York, NY, Aug. 30, 2005, (3 pgs).
Dunga et al. "Electronic Booking and Payment Platforms for Inter-Campus E-Bikes". Engineering Proceedings. Jul. 14, 2023. pp. 1-14. vol. 41, Issue 12.
Aletihadpayments. "Aani | Split the bill with your friends". Oct. 16, 2023. Located via YouTube, free copy available at https://www.youtube.com/watch?v=_wys12-0KmE.
Katariya. "Mastering QR Code Payments: A Guide to Seamless and Effortless Transactions". Jun. 12, 2023. Located via Google Web, free copy available at https://www.mooninvoice.com/blog/qr-code-payments/.
PayBy. "PayBy: Payment at Your Fingertips". Retrieved from the Internet on Dec. 21, 2023. Located via Google Web, free copy available at https://www.payby.com/split-bills.
Natwest. "Request money from someone or split a bill". Retrieved from the Internet on Dec. 21, 2023. Located via Google Web, free copy available at https://www.natwest.com/waystopay/payme.html.
Spoton. "QR Scan & Pay / Order & Pay | SpotOn Order". Jul. 19, 2023. Located via Google Web, free copy available at https://help.spoton.com/space/SK/2457829381/QR+Scan+%26+Pay+%2F+Order+%26+Pay+%7C+SpotOn+Order.
Spoton. "QR Split Payment | SpotOn Order". Jul. 19, 2023. Located via Google Web, free copy available at https://help.spoton.com/space/SK/2262565040/QR+Split+Payment+%7C+SpotOn+Order.
photo.stackexchange.com, "What of those EXIF values tell me more about my image's quality?" Jul. 8, 2017, Photography Stack Exchange, Located via Google Web, available at https://photo.stackexchange.com/questions/90730/what-of-those-exif-values-tell-me-more-about-my-images-quality.
International Search Report and Written Opinion directed to related application No. PCT/US2025/015559, mailed Jun. 11, 2025, 15 pages.

* cited by examiner

ANALYSIS 500

| Type | Dimensions | Data Fields | Reviewed | Pass | |
|---|---|---|---|---|---|
| Money Order | 2.75 X 6 in. | 12 | Y | N | 510 |
| Business/ Personal | 3.5 X 8 in. | 12 | Y | Y | 512 |
| Payroll | 9 3/16" × 13" | 19 | Y | Y | 514 |
| Personal | 3.5 X 5.85 in. | 7 | Y | N | 516 |

REJECTION OF IMPERMISSIBLE DOCUMENTS

BACKGROUND

As financial technology evolves, banks, credit unions and other financial institutions have found ways to make online banking and digital money management more convenient for customers. Mobile banking apps may let you check account balances and transfer money from your mobile device. In addition, a customer may deposit paper checks from virtually anywhere using their smartphone or tablet. However, customers need to take images with, for example, a scanner of the check to have them processed remotely.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
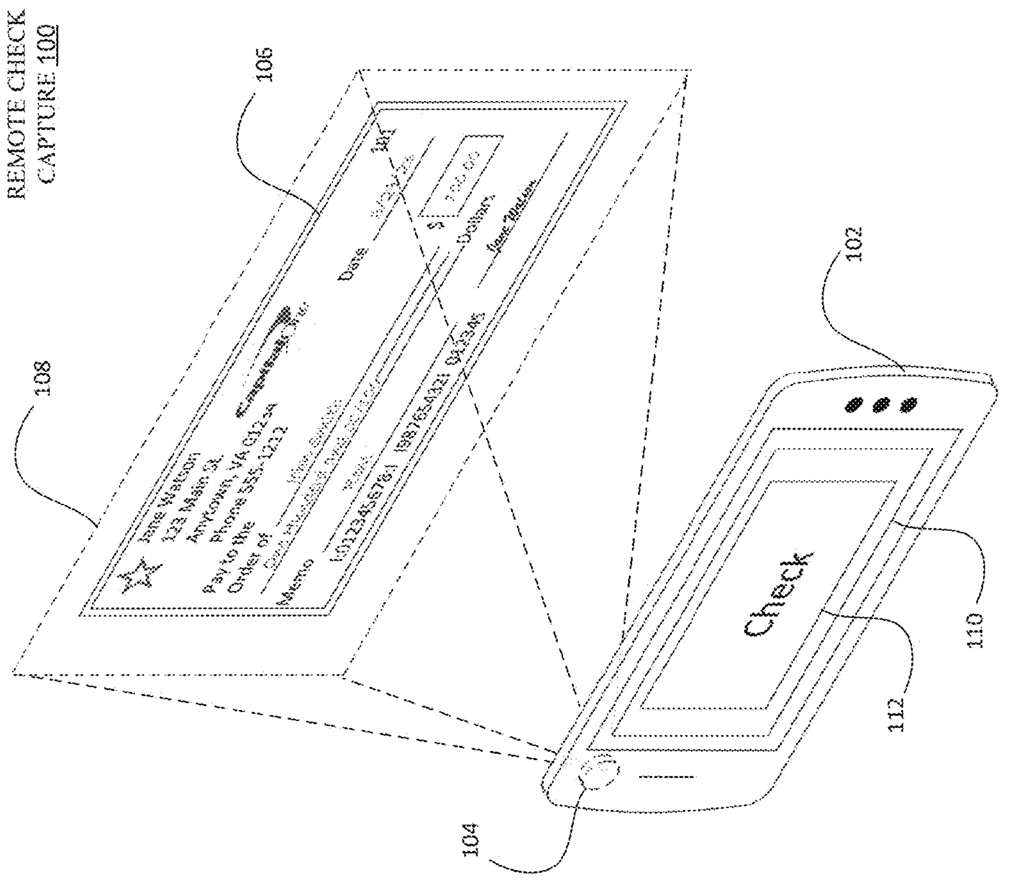
FIG. 1 illustrates an example remote deposit check capture, according to some embodiments and aspects.

Disclosed herein are system, apparatus, device, method and/or computer program product embodiments, and/or combinations and sub-combinations thereof for implementing a computer-based image analysis of documents, such as financial instruments, to determine if they meet at least a threshold of impermissible characteristics. Utilizing this capability, a financial instrument, such as a fraudulent check, may be detected in advance of completing a check deposit processes. Throughout this disclosure, impermissible may refer to one or more characteristics that would cause a check to fail image processing, check processing, security processing or fraud processing sequences. In a non-limiting example, a check that falls outside an expected size range for a specified check type may fail security or fraud measures. In another non-limiting example, a check that includes more or less data fields than expected for a specified check type would fail check processing. In yet another non-limiting example, a check that was printed by a user's computer may contain impermissible ink types, fonts, colors, paper qualities, or lack a perforated edge, to name a few.

Mobile check deposit is a fast, convenient way to deposit funds using a customer's mobile device or laptop. As financial technology and digital money management tools continue to evolve, the process has become safer and easier than ever before. Mobile check deposit is a way to deposit a financial instrument, e.g., a paper check, through a banking app using a smartphone, tablet, laptop, etc. Currently, mobile deposit allows a bank customer to capture a picture of a check using, for example, their smartphone or tablet camera and upload it through a mobile banking app running on the mobile device. Deposits commonly include personal, business or government checks.

Currently, computer-based (e.g., laptop) or mobile-based (e.g., mobile device) technology allows a customer to initiate a document uploading process for uploading images or other electronic versions of a document to a backend system (e.g., a document processing system) for various purposes. In some cases, this technology prevents actions from being performed during the document upload process, i.e., while the document is being uploaded and processed by the backend system. That is, once the customer initiates the document upload process, the process will continue until completion without providing any opportunities for mid-stream adjustments to the process. This restrictive approach is necessitated in certain document upload processes because such processes have automated routines for receiving the images, processing the images, and completing actions associated with the upload of the images. For example, a customer may utilize a mobile deposit application to upload a document associated with a customer account, such as a check associated with the customer's bank account. Once initiated, the document upload process continues until the check has been uploaded without any further inputs. This current process is problematic because the financial instrument may not be permissible, but may not be discovered until after the upload check image process has completed, when it may be too late to cancel or otherwise make changes to the upload.

Most banks and financial institutions use advanced security features to keep an account safe from fraud during the mobile check deposit workflow. For example, security measures may include encryption and device recognition technology. In addition, remote check deposit apps typically captures check deposit information without storing the check images on the customer's mobile device (e.g., smartphone). Mobile check deposit may also eliminate or reduce typical check fraud as a thief of the check may not be allowed to subsequently make use of an already electronically deposited check, whether it has cleared or not and may provide an alert to the banking institution of a second deposit attempt. In addition, fraud controls may include mobile security alerts, such as mobile security notifications or SMS text alerts, which can assist in uncovering or preventing potentially fraudulent activity. The technology described herein provides an additional layer of security by rejecting impermissible check types in real time, before completing the remote check deposit process.

The technology described herein in the various embodiments and aspects implements a "pre-deposit" determination of impermissible check characteristics based on imagery of the check. This imagery may be processed continuously, for example, in real-time, without first capturing an image in memory, or alternatively, the imagery may be stored temporarily within memory of the mobile device memory, such as, in a frame or video buffer. In one aspect, the live camera imagery is streamed as encoded data configured as a byte array (e.g., as a Byte Array Output Stream object). A byte array is a group of contiguous (side-by-side) bytes, for example, forming a bitmap image that may be processed by an Optical Character Recognition (OCR) process. OCR is the electronic or mechanical conversion of images of typed, handwritten or printed text into machine-encoded text, whether from a scanned document, a photo of a document, a scene photo, stream of image data, etc.

In some aspects, the technology disclosed herein implements "Active OCR" as further described in U.S. application Ser. No. 18/503,778, entitled "Active OCR," filed Nov. 7, 2023, and incorporated by reference in its entirety. Active OCR includes performing OCR processing on image objects formed from a raw live video stream of image data originating from an activated camera on a client device. The image objects may capture portions of a check or an entire image of the check. As a portion of a check image is formed into a byte array, it may be provided to the active OCR system to extract any data fields found within the byte array in real-time or near real-time. In a non-limiting example, if the live video streamed image data contains an upper right corner of a check formed in a byte array, the byte array may be processed by the active OCR system to extract the origination date of the check.

In the various embodiments and aspects disclosed herein, active OCR is able to OCR check images mid-experience instead of after submission. In some embodiments, the camera continuously streams image data until a portion or all of the data fields have been extracted from the imagery. In some embodiments, success or failure of a remote deposit process may be determined based on reaching an impermissible check threshold. For example, if a trained Machine Learning (ML) OCR model reaches a determination of 85% surety of an impermissible check data field, then the check deposit process is terminated.

In some embodiments, various check features, such as specific data fields, framing, edge detection, sizing, paper quality, inks, fonts, to name a few, may be processed by computer vision algorithms to determine impermissibility based on a specified check type. In some embodiments, success or failure of a remote deposit process may be determined based on reaching an impermissible check threshold. For example, if a trained Machine Learning (ML) model reaches a determination of 85% surety of an impermissible check size, then the check deposit process is terminated.

While described throughout for active OCR and computer vision processing on a client device, such as a mobile computing device, a live stream of imagery may be communicated from the mobile computing device to one or more remote computing devices or cloud-based systems for performing a remote image processing.

Figure 3:
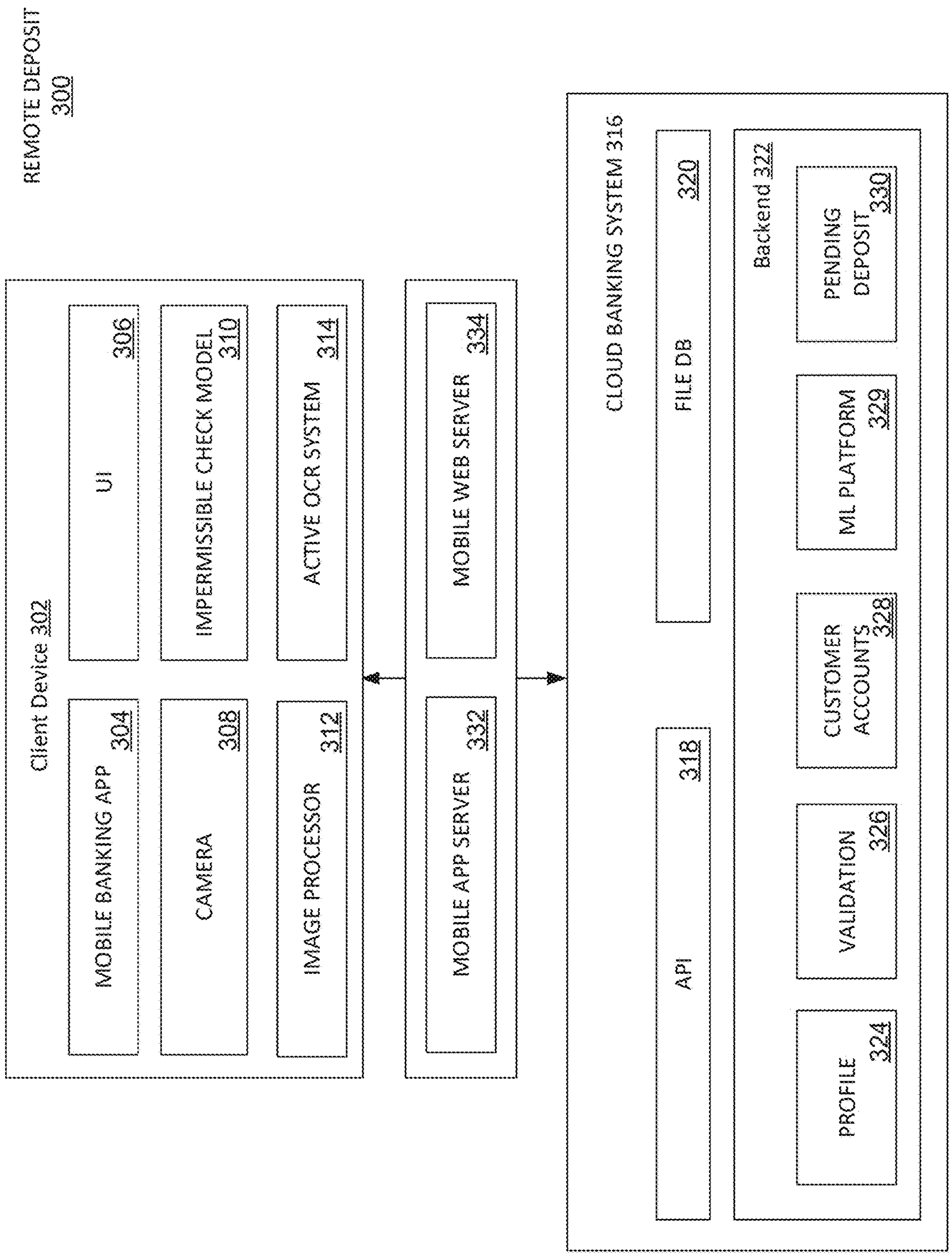
FIG. 3 illustrates a block diagram of a remote deposit system architecture, according to some embodiments and aspects.
Figure 4:
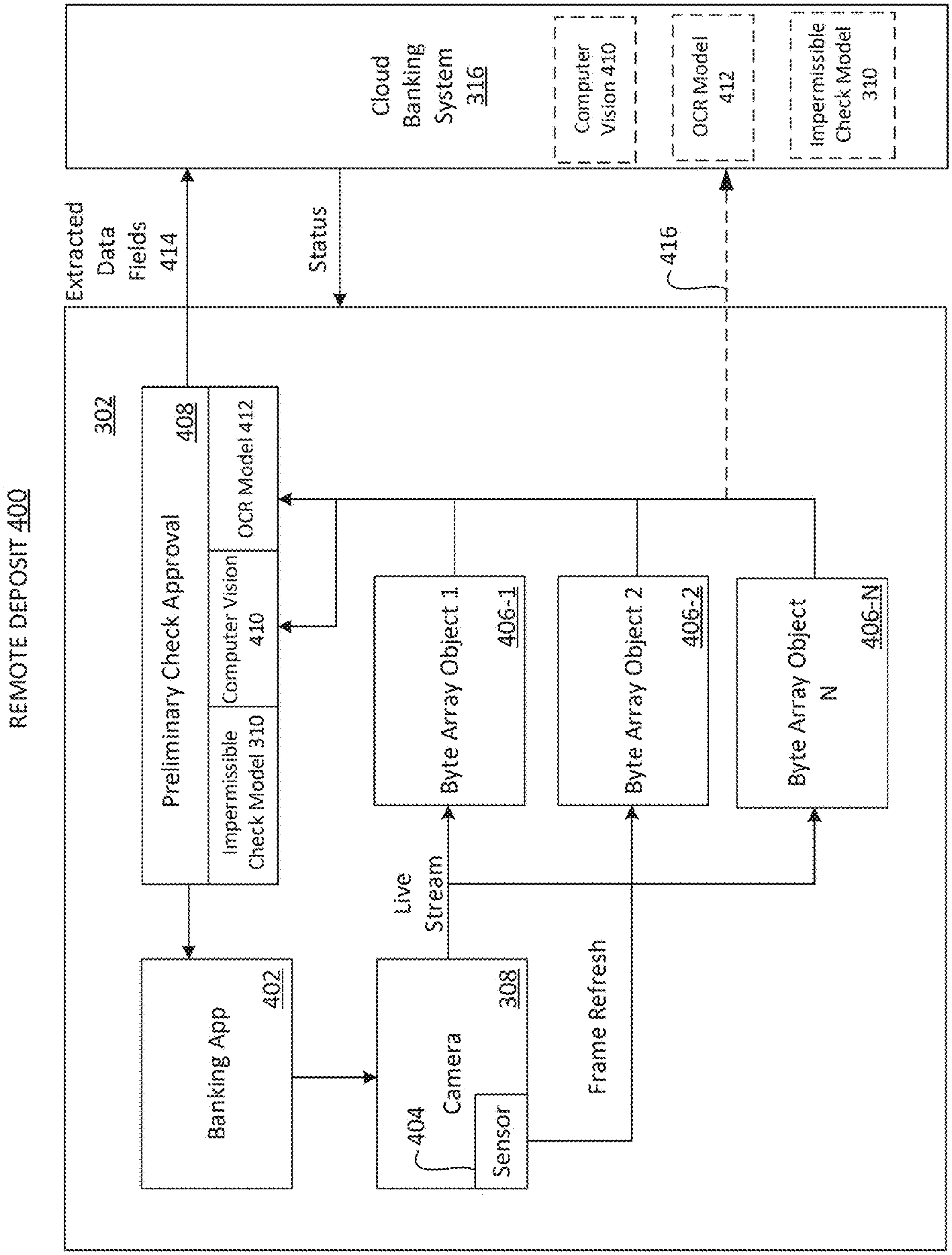
FIG. 4 illustrates an example diagram of a client computing device, according to some embodiments and aspects.
Figure 6:
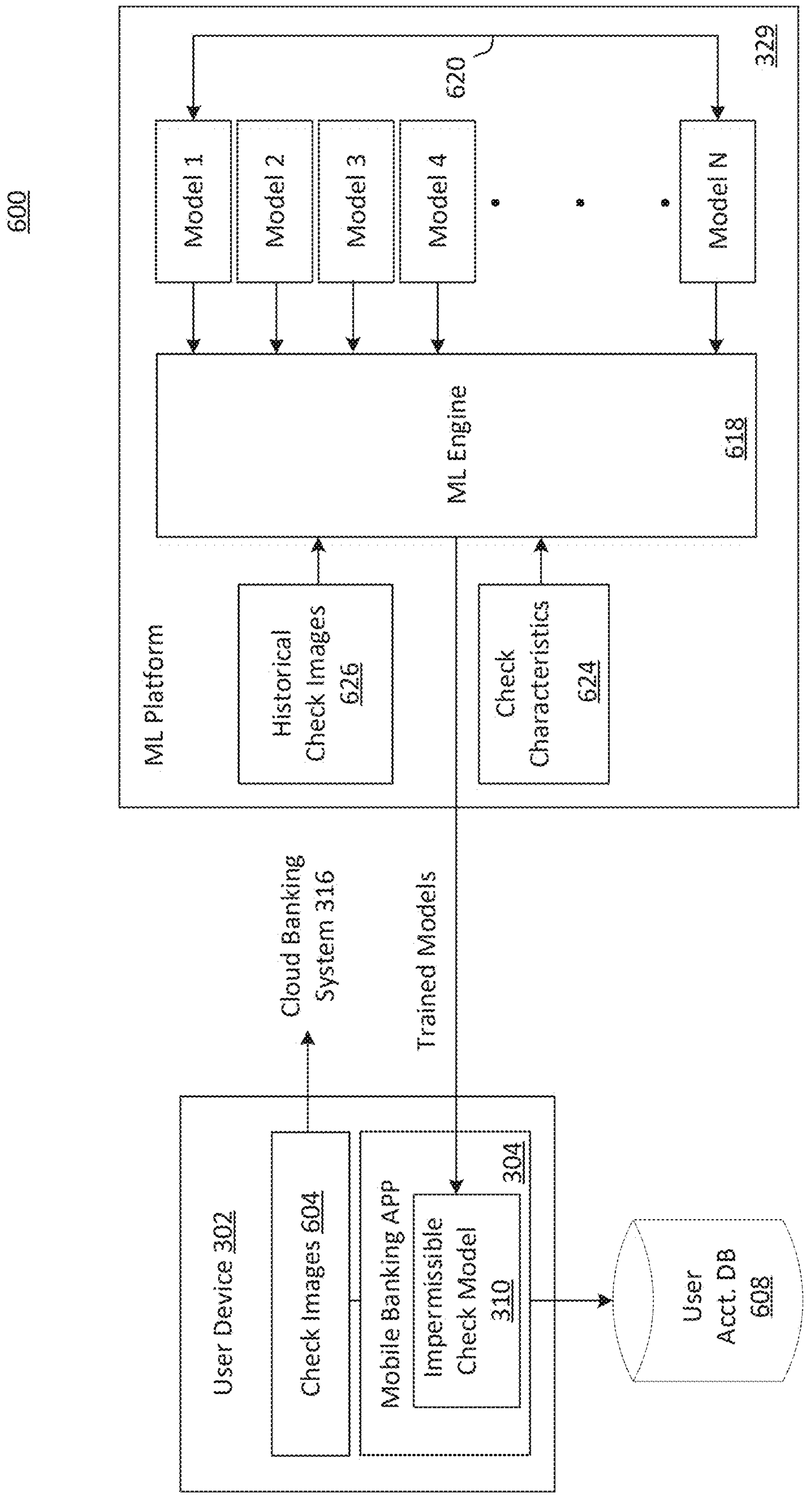
FIG. 6 illustrates a ML block diagram for a remote deposit system, according to embodiments and aspects.

Various aspects of this disclosure may be implemented using and/or may be part of a remote deposit systems shown in FIGS. 3, 4 and 6. It is noted, however, that this environment is provided solely for illustrative purposes, and is not limiting. Aspects of this disclosure may be implemented using and/or may be part of environments different from and/or in addition to the remote deposit system, as will be appreciated by persons skilled in the relevant art(s) based on the teachings contained herein. An example of the remote deposit system shall now be described.

FIG. 1 illustrates an example remote check capture 100, according to some embodiments and aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 1, as will be understood by a person of ordinary skill in the art.

Sample check 106, may be a personal check, paycheck, or government check, to name a few. In some embodiments, a customer will initiate a remote deposit check capture from their mobile computing device (e.g., smartphone) 102, but other digital camera devices (e.g., tablet computer, personal digital assistant (PDA), desktop workstations, laptop or notebook computers, wearable computers, such as, but not limited to, Head Mounted Displays (HMDs), computer goggles, computer glasses, smartwatches, etc., may be substituted without departing from the scope of the technology disclosed herein. For example, when the document to be deposited is a personal check, the customer will select a customer account associated with their bank (e.g., checking or savings) into which the funds specified by the check are to be deposited. Content data fields associated with the check document include a funds or monetary amount to be deposited to the customer account, the issuing bank, the routing number, the account number, signature fields, etc. Content associated with the customer's account may include a risk profile associated with the account and the current balance of the account. Options associated with a remote deposit process may include continuing with the deposit process or cancelling the deposit process, thereby cancelling a deposit of the check into the customer's account.

Mobile computing device 102 may communicate with a bank or third party using a communication or network interface (not shown). Communication interfaces may communicate and interact with any combination of external devices, external networks, external entities, etc. For example, a communication interface may allow mobile computing device 102 to communicate with external or remote devices over a communications path, which may be wired and/or wireless (or a combination thereof), and which may include any combination of LANs, WANs, the Internet, etc. Control logic and/or data may be transmitted to and from a mobile computing device via a communication path that includes the Internet.

In an example approach, a customer will login to their mobile banking app, select the account they want to deposit a check into, then select, for example, a "deposit check" option that will activate their mobile device's camera 104 (e.g., open the camera port). One skilled in the art would understand that variations of this approach or functionally equivalent alternative approaches may be substituted to initiate a mobile deposit.

In a computing device with a camera, such as a smartphone or tablet, multiple cameras (each of which may have its own image sensor or which may share one or more image sensors) or camera lenses may be implemented to process imagery. For example, a smartphone may implement three cameras, each of which has a lens system and an image sensor. Each image sensor may be the same or the cameras may include different image sensors (e.g., every image sensor is 24 MP; the first camera has a 24 MP image sensor, the second camera has a 24 MP image sensor, and the third camera has a 12 MP image sensor; etc.). In the first camera, a first lens may be dedicated to imaging applications that can benefit from a longer focal length than standard lenses. For example, a telephoto lens generates a narrow field of view and a magnified image. In the second camera, a second lens may be dedicated to imaging applications that can benefit from wide images. For example, a wide lens may include a wider field-of-view to generate imagery with elongated features, while making closer objects appear larger. In the third camera, a third lens may be dedicated to imaging applications that can benefit from an ultra-wide field of view. For example, an ultra-wide lens may generate a field of view that includes a larger portion of an object or objects located within a user's environment. The individual lenses may work separately or in combination to provide a versatile image processing capability for the computing device. While described for three differing cameras or lenses, the number of cameras or lenses may vary, to include duplicate cameras or lenses, without departing from the scope of the technologies disclosed herein. In addition, the focal lengths of the lenses may be varied, the lenses may be grouped in any configuration, and they may be distributed along any surface, for example, a front surface and/or back surface of the computing device.

In one non-limiting example, active OCR processes may benefit from image object builds generated by one or more, or a combination of cameras or lenses. For example, multiple cameras or lenses may separately, or in combination, capture specific blocks of imagery for data fields located within a document that is present, at least in part, within the field of view of the cameras. In another example, multiple cameras or lenses may capture more light than a single camera or lens, resulting in better image quality. In another example, individual lenses, or a combination of lenses, may generate depth data for one or more objects located within a field of view of the camera.

Using the camera 104 function on the mobile computing device 102, the customer captures live imagery from a field of view 108 that displays at least a portion of one side of a check 112. Typically, the camera's field of view 108 will include at least the perimeter of the check. However, any camera position that generates in-focus imagery of the various data fields located on a check may be considered. Resolution, distance, alignment and lighting parameters may require movement of the mobile device until a proper view of a complete check, in-focus, has occurred. An application running on the mobile computer device may offer suggestions or technical assistance to guide a proper framing of a check within the banking app's graphically displayed window 110, displayed on a Customer Interface (UI) instantiated by the mobile banking app. A person skilled in the art of remote deposit would be aware of common requirements and limitations and would understand that different approaches may be required based on the environment in which the check viewing occurs. For example, poor lighting or reflections may require specific alternative techniques. As such, any known or future viewing or capture techniques are considered to be within the scope of the technology described herein. Alternatively, the camera can be remote to the mobile computing device 102. In an alternative embodiment, the remote deposit may be implemented on a desktop computing device with an accompanying digital camera.

Sample customer instructions may include, but are not limited to, "Once you've completed filling out the check information and signed the back, it's time to view your check," "For best results, place your check on a flat, dark-background surface to improve clarity," "Make sure all four corners of the check fit within the on-screen frame to avoid any processing holdups," "Select the camera icon in your mobile app to open the camera," "Once you've viewed a clear image of the front of the check, repeat the process on the back of the check," "Do you accept the funds availability schedule?," "Swipe the Slide to Deposit button to submit the deposit," "Your deposit request may have gone through, but it's still a good idea to hold on to your check for a few days," "keep the check in a safe, secure place until you see the full amount deposited in your account," and "after the deposit is confirmed, you can safely destroy the check." These instructions are provided as sample instructions or comments, but any instructions or comments that guide the customer through a remote deposit session may be included.

Figure 2:
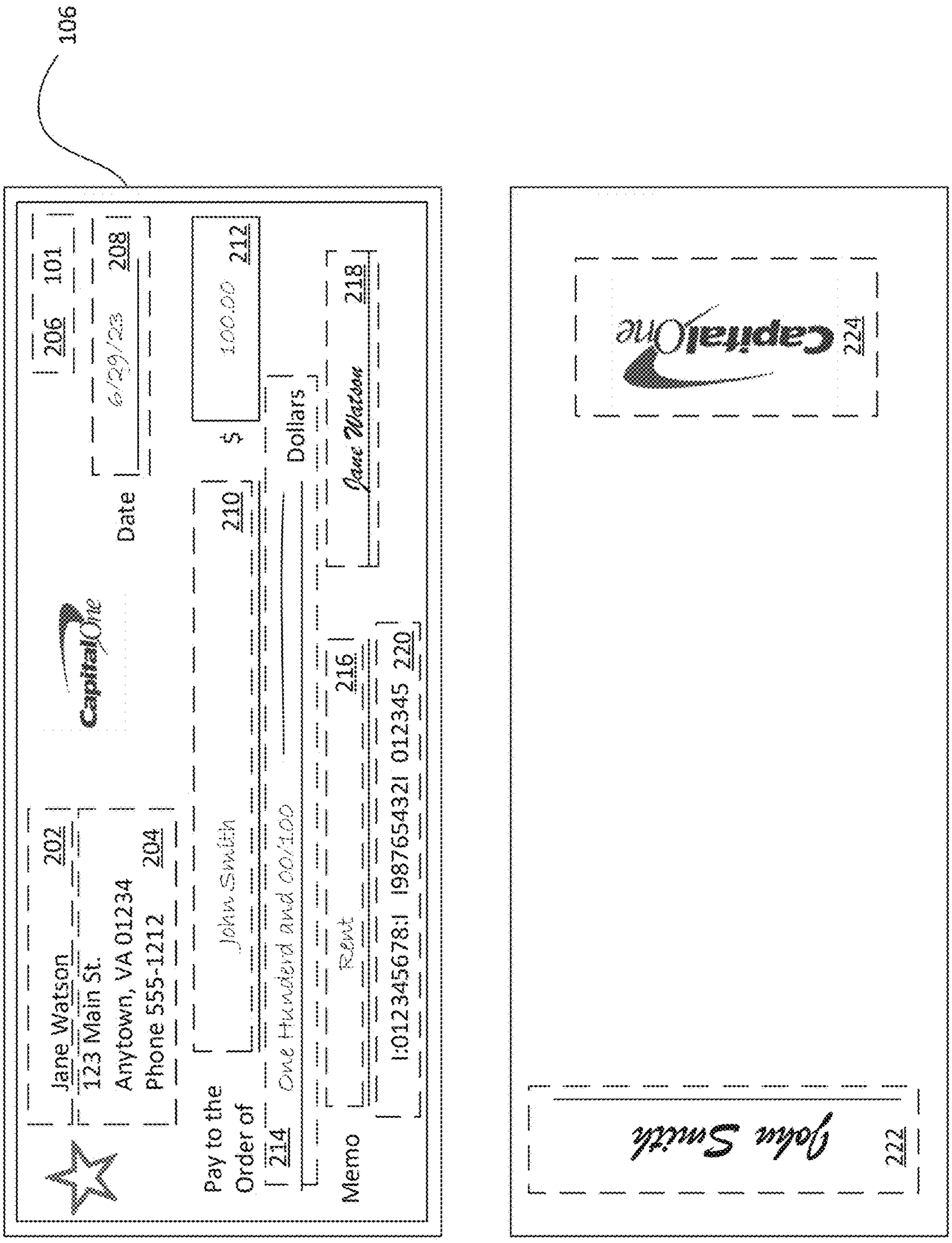
FIG. 2 illustrates example remote deposit OCR segmentation, according to some embodiments and aspects.

FIG. 2 illustrates an example of remote deposit OCR segmentation, according to some embodiments and aspects. Depending on a check type, a check may have a fixed number of identifiable data fields. For example, a standard personal check may have front side data fields, such as, but not limited to, a payor customer name 202 and address 204, check number 206, date 208, payee field 210, payment amount 212, a written amount 214, memo line 216, Magnetic Ink Character Recognition (MICR) line 220 that includes a string of characters including the bank routing number, the payor customer's account number, and the check number, and finally, the payor customer's signature 218. Back side identifiable fields may include, but are not limited to, payee signature 222 and security fields 224, such as a watermark.

While a number of fields have been described, it is not intended to limit the technology disclosed herein to these specific fields, as a check may have more or less identifiable fields than disclosed herein. In addition, security measures may include alternative approaches discoverable on the front side or back side of the check or discoverable by processing of identified information. For example, the remote deposit feature in the mobile banking app running on the mobile device 102 may determine whether the payment amount 212 and the written amount 214 are the same. Additional processing may be needed to determine a final amount to process the check if the two amounts are inconsistent. In one non-limiting example, the written amount 214 may supersede any amount identified within the amount field 212.

In one embodiment, an active OCR of the stream of check imagery may include implementing instructions resident on the customer's mobile computing device to process each of the field locations on the check as they are detected or systematically (e.g., ordered list extracted from a Byte Array Output Stream object). For example, the streaming check imagery reflects a viewport pixel scan from left-to-right or from top-to-bottom with data fields identified within a frame of the check as they are streamed. In one non-limiting example, the customer holds their smartphone over a check (or checks) to be deposited remotely while the streaming viewport imagery is continuously OCR processed until data from each of required data fields has been extracted.

In another example embodiment, fields that include typed information, such as the MICA line 220, check number 206, payor customer name 202 and address 204, etc., may be OCR processed first from the Byte Array Output Stream object, followed by a more complex or time intensive OCR process of identifying written fields, such as the payee field 210, signature 218, to name a few.

In some embodiments, artificial intelligence (AI), such as machine-learning (ML) systems (e.g., FIG. 6) train one or more model(s) to recognize document perimeters, framing, characters, numerals, colors, fonts, data fields, or other check characteristics of the streamed imagery. ML involves computers discovering how they can perform tasks without being explicitly programmed to do so. ML includes, but is not limited to, artificial intelligence, deep learning, fuzzy learning, supervised learning, unsupervised learning, etc. Machine learning algorithms build a model (or algorithm) based on sample data, known as "training data", in order to make predictions or decisions without being explicitly programmed to do so. For supervised learning, the computer is presented with example inputs and their desired outputs and the goal is to learn a general rule that maps inputs to outputs. In another example, for unsupervised learning, no labels are given to the learning algorithm, leaving it on its own to find structure in its input. Unsupervised learning can be a goal in itself (discovering hidden patterns in data) or a means towards an end (feature learning). In some embodiments, an OCR, computer vision or impermissible document ML model may be resident on the mobile device and may be integrated with or be separate from the banking application. The various ML models may be continuously updated by future transactions used to further train and improve existing versions of the ML model(s).

A machine-learning engine may use various classifiers to map concepts associated with a specific image process to capture relationships between concepts (e.g., image clarity vs. recognition of specific characters or numerals) and a remote deposit success history. The classifier (discriminator) is trained to distinguish (recognize) variations. Different variations may be classified to ensure no collapse of the classifier so that variations may be distinguished.

In some aspects, machine learning models may be initially trained on a remote machine learning platform (e.g., see FIG. 3, element 329) using other customer's transactional information (e.g., previous remote deposit imagery). In addition, large training sets of the other customer's historical information may be used to normalize prediction data (e.g., not skewed by a single or few occurrences of a data artifact). Thereafter, a predictive model(s) may classify a specific check characteristic against the trained predictive model to predict impermissible checks.

In some aspects, a ML engine may continuously change weighting of model inputs or features to increase customer interactions with the remote deposit procedures. For example, weighting of specific data fields may be continuously modified in the ML model to trend towards greater success. Conversely, term weighting that lowers successful remote deposit interactions may be lowered or eliminated.

FIG. 3 illustrates a remote deposit system architecture 300, according to some embodiments and aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 3, as will be understood by a person of ordinary skill in the art.

As described throughout, a client device 302 (e.g., mobile computing device 102) implements remote deposit processing for one or more financial instruments, such as checks. The client device 302 is configured to communicate with a cloud banking system 316 to complete various phases of a remote deposit as will be discussed in greater detail hereafter.

In aspects, the cloud banking system 316 may be implemented as one or more servers. Cloud banking system 316 may be implemented as a variety of centralized or decentralized computing devices. For example, cloud banking system 316 may be a mobile device, a laptop computer, a desktop computer, grid-computing resources, a virtualized computing resource, cloud computing resources, peer-to-peer distributed computing devices, a server farm, or a combination thereof. Cloud banking system 316 may be centralized in a single device, distributed across multiple devices within a cloud network, distributed across different geographic locations, or embedded within a network. Cloud banking system 316 can communicate with other devices, such as a client device 302. Components of cloud banking system 316, such as Application Programming Interface (API) 318, file database (DB) 320, as well as backend 322, may be implemented within the same device (such as when a cloud banking system 316 is implemented as a single device) or as separate devices (e.g., when cloud banking system 316 is implemented as a distributed system with components connected via a network).

Mobile banking app 304 is a computer program or software application designed to run on a mobile device such as a phone, tablet, or watch. However, in a desktop application, the mobile banking app may be configured to run on desktop computers, and web applications, which run in web browsers rather than directly on a mobile device. Apps are broadly classified into three types: native apps, hybrid and web apps. Native applications are designed specifically for a mobile operating system, typically iOS or Android. Web apps are written in HTML5 or CSS and typically run through a browser. Hybrid apps are built using web technologies such as JavaScript, CSS, and HTML5 and function like web apps disguised in a native container.

Financial instrument imagery may originate from any of, but not limited to, image streams (e.g., series of pixels or frames) or video streams or a combination of any of these or future image formats. A customer of a client device 302, operating a mobile banking app 304 through an interactive UI 306, frames at least a portion of a check (e.g., identifiable fields on front or back of check) with a camera (e.g., field of view). In one aspect, imagery is processed from live stream check imagery from camera 308, as communicated from a camera port over a period of time, until an OCR operation has been completed. In one aspect, the camera imagery is streamed as encoded text, such as a byte array. Alternatively, or in addition to, the live imagery is buffered by storing (e.g., at least temporarily) as images or frames in computer memory. For example, live streamed check imagery 308 is stored locally in memory of image processor 312, such as, but not limited to, a frame buffer, a video buffer, a streaming buffer, or a virtual buffer.

One function of image processer 312 is to process images using computer vision algorithms to detect visible check irregularities. For example, a personal check may be expected to be in a standardized size of 2.75 by 6 inches, be perforated along at least one edge and be consistent with a check provider's paper quality (e.g., density and smoothness), fonts and color palette. One or more computer vision algorithms, implemented by the image processer, may determine sizing of a check based on a detected outside edge, border or relative data field position. In addition, the computer vision algorithms may detect various physical attributes of the check, such as, but not limited to, border detection, colors, fonts, resolution, inks, watermarks, paper quality, etc.

Active OCR system 314, resident on the client device 302, processes the live streamed check imagery from camera 308 to extract data by identifying specific data located within known sections of the check to be electronically deposited. In one non-limiting example aspect, single identifiable fields, such as the payor customer name 202, MICR data field 220 identifying customer and bank information (e.g., bank name, bank routing number, customer account number, and check number), date field 208, check amount 212 and written amount 213, and authentication (e.g., payee signature 222) and anti-fraud (e.g., watermark 223), etc. are processed by the active OCR system 314. In some aspects disclosed herein, the active OCR system 314 process is completed before finalization of a remote deposit operation.

Impermissible Check Model 310 receives data inputs from either one, or both, of the image processor 312 or active OCR system 314. Based on this data, the impermissible check model 310 may include instructions to implement one or more computer algorithms to review a current check for various known impermissible check elements, characteristics, or features. In some embodiments, the impermissible check model 310 may be a ML model (e.g., FIG. 6, 620) trained by imagery including the various impermissible check elements. Upon reaching a surety threshold score (e.g., 85%) of impermissible characteristics of a current check being deposited, the remote deposit and OCR processes may be paused or terminated and the status communicated to cloud banking system 316 for validation, security, quality assurance or customer account review purposes, to name a few. A threshold of 85% is described as an example, but any characteristic or selectable threshold value may be chosen to determine impermissibility of a check during a remote deposit process. For example, each impermissible characteristic may be assigned a severity index score and one or more of the detected characteristic's scores aggregated, averaged or represented as a mean derivation.

Active OCR system 314 communicates data extracted from the one or more data fields during the active OCR operation to cloud banking system 316. For example, the extracted data identified within these fields is communicated to file database (DB) 320 either through a mobile app server 332 or mobile web server 334 depending on the configuration of the client device (e.g., mobile or desktop). In one aspect, the extracted data identified within these fields is communicated through the mobile banking app 304.

Alternatively, or in addition to, a thin client (not shown) resident on the client device 302 processes imagery locally with assistance from cloud banking system 316. For example, a processor (e.g., CPU) implements at least a portion of remote deposit functionality using resources stored on a remote server instead of a localized memory. The thin client connects remotely to the server-based computing environment (e.g., cloud banking system 316) where applications, sensitive data, and memory may be stored.

Backend 322, may include one or more system servers processing banking deposit operations in a secure environment. These one or more system servers operate to support client device 302. API 318 is an intermediary software interface between mobile banking app 304, installed on client device 302, and one or more server systems, such as, but not limited to the backend 322, as well as third party servers (not shown). The API 318 is available to be called by mobile clients through a mobile edge server (not shown) within cloud banking system 316. File DB stores files received from the client device 302 or generated as a result of processing a remote deposit.

Profile module 324 retrieves customer profiles associated with the customer from a registry after extracting customer data from front or back images of the financial instrument. Customer profiles may be used to determine deposit limits, historical activity, security data, or other customer related data.

Validation module 326 generates a set of validations including, but not limited to, any of: mobile deposit eligibility, account, image, transaction limits, duplicate checks, amount mismatch, MICR, multiple deposit, etc. While shown as a single module, the various validations may be performed by, or in conjunction with, the client device 302, cloud banking system 316 or third party computer-based systems.

Customer Accounts 328 includes, but is not limited to, a customer's financial banking information, such as individual, joint, or commercial account information, balances, loans, credit cards, account historical data, etc.

ML Platform 329 may include a trained computer vision model or OCR model or a ML engine to train the computer vision model or the OCR model(s) used to process visible check characteristics and extract and process OCR data. This disclosure is not intended to limit the ML Platform 329 to only vision or OCR model generation, as it may also include, but not be limited to, remote deposit models, risk models, funding models, security models, etc. While described throughout for check documents, any document may be processed by the technology disclosed herein.

When remote deposit status information is generated, it is passed back to the client device 302 through API 318 where it is formatted for communication and display on the client device 302 and may, for example, communicate a termination or funds availability schedule for display or rendering on the customer's device through the mobile banking app UI 306. The UI may instantiate the status information as images, graphics, audio, additional content, etc.

Pending deposit 330 includes a profile of a potential upcoming deposit(s) based on an acceptance by the customer through UI 306 of a deposit according to given terms. If the deposit is successful, the flow creates a record for the transaction and this function retrieves a product type associated with the account, retrieves the interactions, and creates a pending check deposit activity.

Alternatively, or in addition to, one or more components of the remote deposit process may be implemented within the client device 302, third party platforms, the cloud-based banking system 316, or distributed across multiple computer-based systems. The UI may instantiate the remote deposit status as images, graphics, audio, additional content, etc. In one technical improvement over current processing systems, the remote deposit status is provided mid-stream, prior to completion of the deposit. In this approach, the bank or the customer may terminate the remote deposit process prior to completion.

In one aspect embodiment, remote deposit system 300 tracks customer behavior. For example, did the customer attempt a remote deposit operation with an impermissible check? Is this a second or greater attempt at depositing impermissible checks? In some aspects, the completion of the remote deposit operation reflects a successful outcome and permissible check, while a cancellation reflects a failed outcome. In some aspects, this customer behavior, not limited to success/failure, may be fed back to the ML platform 329 to enhance future training of a remote deposit model. For example, in some embodiments, one or more inputs to the ML remote deposit models may be weighted differently (higher or lower) to effect a predicted higher successful outcome.

FIG. 4 illustrates an example flow diagram of a remote deposit system, according to some embodiments and aspects. The remote deposit 400 flow may include one or more computing processors or system servers processing remote banking deposit operations in a secure closed loop. While described for a mobile computing device, desktop solutions may be substituted without departing from the scope of the technology described herein. These system servers may operate to support mobile computing devices from the cloud. It is noted that the structural and functional aspects of the system servers may wholly or partially exist in the same or different ones of the system servers or on the mobile device itself. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 4, as will be understood by a person of ordinary skill in the art.

As will be described further hereafter, a preliminary check approval module 408, processes a check to determine, in real time, the permissibility or impermissibility of a check(s) that is the subject of a remote deposit transaction. Imagery of the check may be processed to extract data fields in an OCR model 412 (e.g., active OCR model 314) to detect impermissible checks based on impermissible check model 310 processing these extracted data fields. Alternatively, or in addition to, the imagery may be processed by computer vision system 410 to detect physical characteristics of the check. These physical characteristics may also be inputs, separately or in combination, to impermissible check model 310 and further assist in a pre-deposit check characteristic or data field approval or disapproval.

In one embodiment, the Banking App 402 (e.g., mobile banking app 304) is opened on client computing device 302 and the deposit check function selected to initiate a remote deposit process. A camera viewport is opened for camera 308 to communicate a live stream of imagery (e.g., frames of video) from a field of view of the camera 308. A viewport may output, for display on client device 302, a frame (e.g., an image frame or a frame of a video, for example) having one or more images that are viewable by camera 308. An image frame may include one or more images that may represent one or more real-world objects. For instance, the image may represent one or more individual objects within the group, for example, one check or an entire group of checks in a field of view of camera 308. In one aspect, the image of decodable check indicia can be provided by a raw image byte stream or by a byte array, a compressed image byte stream or byte array, and/or a partial compressed image byte stream or byte array.

In some embodiments, a raw video stream may be detected by an active-pixel sensor 404 (such as a complementary metal-oxide-semiconductor (CMOS) image sensor or a charge-coupled device (CCD). In CCDs, there is a photoactive region (an epitaxial layer of silicon), and a transmission region made out of a shift register. An image is first projected through a lens onto the photoactive region of the CCD, causing each capacitor of a capacitor array to accumulate an electric charge proportional to the light intensity at that location. A one-dimensional array, used in line-scan cameras, captures a single slice of the image, whereas a two-dimensional array, used in video and still cameras, captures a two-dimensional picture corresponding to the scene projected onto the focal plane of the sensor. Once the array has been exposed to the image, a control circuit causes each capacitor to transfer its contents to its neighbor (operating as a shift register). The last capacitor in the array dumps its charge into a charge amplifier, which converts the charge into a voltage. By repeating this process, the controlling circuit converts the entire contents of the array in the semiconductor to a sequence of voltages. These voltages are then sampled, digitized, and may be stored in computer memory within client device 302, such as image memory for image processor 312.

While any portion of a byte array may be processed during image processing, in some embodiments, a byte array object 406 (1-N) of an entire frame, or multiple frames, may be processed sequentially until computer vision algorithms or OCR processing data fields extraction has been completed. For example, multiple images or multiple image portions may be processed to collectively overcome low quality image captures, such as, but not limited to those images that are missing pixels, that include shadowing, that are taken from sharp angles, or that are off-centered, to name a few. In a non-limiting example, a first image may have a right corner missing. A second image may be subsequently processed to capture any data fields that may be located in the missing corner. The technology described herein extracts as many fields from a byte array object, including a frame, or at least a portion of a frame, and continues the extraction process, processing as many images or image portions, until all data fields have been extracted. Continuing from the above example, if only a lower right corner of an image is missing, a byte array substantially formed from pixels originating from the lower right corner of the check image may be OCR processed to capture the missing data field(s) using any of the techniques disclosed herein. Corner and position designations may be generated based on the recognition of check border or edges.

In some aspects, the computer vision system 410 or the OCR model 412 may be implemented on the client computing device 302, or optionally be located 416 on the cloud banking system 316 and implemented remotely. In some aspects, the raw image live stream is first converted to a byte array and then communicated to the computer vision system 410 or OCR model 412 (buffered or not buffered). The data embedded in the byte stream or byte array, is then processed by program instructions of the computer vision system 410 or model 412 and saved to memory of the client device 302. This data may be transmitted 414 on a continuous basis, transmitted periodically, or transmitted after completion of the image processing (e.g., after all data fields are extracted), as check data fields to a cloud banking system 316 via a network connection.

In some embodiments, the impermissible check model 310 may process the imagery for impermissible check characteristics, such as, but not limited to sizing, colors, edge characteristic (e.g., perforations), extracted data fields, etc. One goal is a computer capable of "understanding" the contents of images, including the contextual nuances within them. The technology can then accurately extract information and insights contained in the images as well as categorize and organize the images or fields within images themselves. Alternatively, computer vision system 410 may be implemented on the Computer Banking system 316 and further be used to train and improve the previously described ML models, OCR Model 412 and Impermissible Check Model 310, which may be operative with the mobile device for localized processing of camera imagery.

In one aspect, the front side imagery is processed followed by the back side imagery. Alternatively, or in combination, the front side and back side imagery is processed together or in parallel.

The technical solution disclosed herein accelerates the remote check deposit process and allows mid-stream alterations or improvements, for example, real-time check impermissibility guidance. In addition, the technical solution disclosed herein provides a technical advantage over current systems by processing visible characteristics, extracted data fields or a combination of thereof to provide real-time check impermissibility guidance.

Alternatively, or in addition to, one or more components of the remote deposit flow may be implemented within the customer device, third party platforms, a cloud-based system, or be distributed across multiple computer-based systems.

Figure 5:
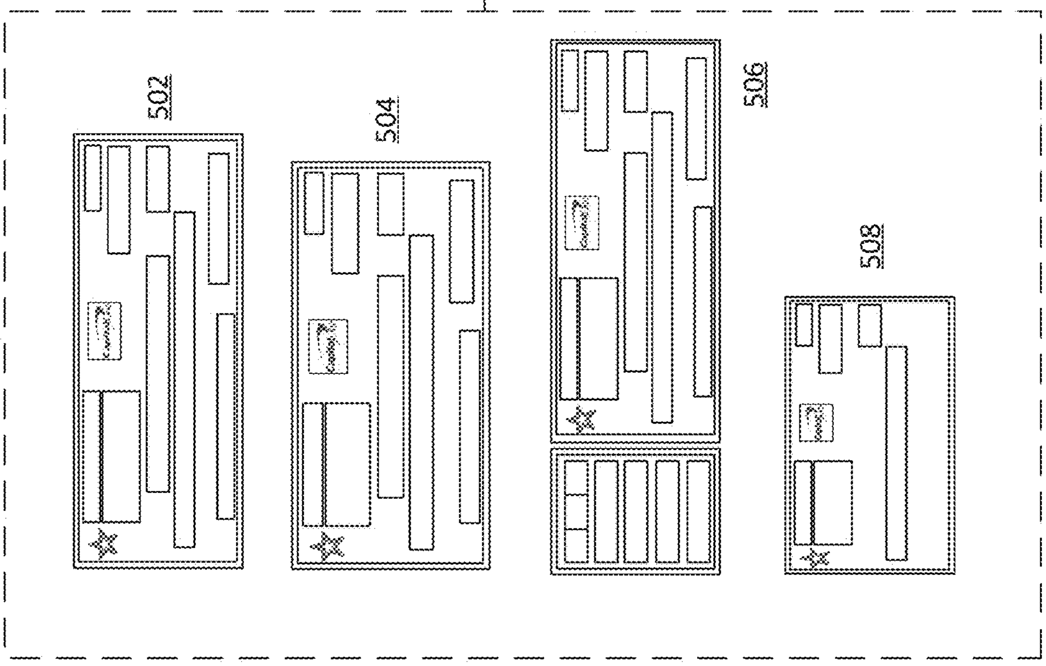
FIG. 5 illustrates an example diagram of check styles, according to some embodiments and aspects.

FIG. 5 illustrates an example diagram of check styles and an analysis 500 with review/pass status, according to some embodiments and aspects. In some embodiments, impermissibility of a check during a remote deposit is based on determining if one or more, or a combination, of aspects of the check meet at least a threshold of impermissible check characteristics. Utilizing this capability, a financial instrument, such as a fraudulent check, may be detected in advance of completing a remote check deposit processes.

Checks may be considered impermissible for many reasons. Throughout this disclosure, various check characteristics that may lead to reaching an impermissible check score are provided. These are not meant to be limiting examples, as other characteristics (e.g., known check originator color, paper and font configurations, etc.) of checks may contribute to an impermissible check score threshold. For example, failure to adhere to check standards as defined by the American National Standards Institute (ANSI) may result in a determination of impermissibility and pause or terminate a remote check process.

Below, are a few example check characteristic standards according to the American National Standards Institute (ANSI):

a. The standard check size must be at least 6 inches in the width and it cannot exceed 8.75 inches. The height of the check must also be between 2.75 and 3.66 inches.
b. MICR fonts are the characters that appear at the bottom of checks or financial documents. There are two different MICR fonts that can be used on checks or financial documents depending on the banking standards of the country of origination. The two different fonts used are E-13B or CMC-7. For the United States, the official font used is the E-13B font. Using any other fonts besides these two fonts will be out of compliance with ANSI.
c. The MICR line is made up of ten number characters (0-9) and four special symbols in the form of a transit, amount, on-us, and dash. This line is broken up into 5 fields: the amount, on-us, transit, external processing code (EPC), and auxiliary on-us field. This information is printed in an area called the "clear band," and the bottom of the MICR line should start 3/16 of an inch from the bottom of the check.
d. The amount data field occupies positions 1-12 on the MICR line. This field is not set by the check supplier, but instead, is made during a post-encoding process at the bank where a deposit was made.
e. The on-us data field occupies positions 13-32 on the MICR line. This line is not a static field, and the bank usually occupies the on-us field with the account holder's account number information.
f. The transit field occupies positions 33-43 on the MICR line. This is a fixed field that cannot be altered by the bank later on, and it is sometimes referred to as the routing field. This field routes the check through the system.
g. The External Processing Field is located at position 44 or 45. This character is set by the ASC (Accredited Standards Committee), and it cannot be altered without approval.
h. An Auxiliary On-Us Field occupies positions 45+. This is usually the check serial number, and it cannot pass further than an eighth of an inch from the edge of the check.
i. Depending on the type of MICR printer, a MICR ink or MICR toner is needed. MICR ink is used in Inkjet printers, and MICR toner is used in laser printers. ANSI and the Federal Reserve both require banks to print checks with MICR ink or toner for processing and check clearance. Originally manufactured MICR ink and toner cartridges meet the ANSI standards for check printing while remanufactured MICR ink and toner cartridges aren't guaranteed to meet those sets of standards. MICR toner consists of iron oxide. This creates the magnetic properties to the toner, and it enables the high-speed check processor to read the characters quickly as it passes through the system.
j. Other check paper impermissible characteristics may include, but are not limited to, low quality, cheaper check paper, or damaged checks. To adhere with ANSI, the weight of the paper needs to be at least 20-pound long grain with the paper moisture content being between 4.7 to 5.5%.

In a non-limiting example, check 502 with analysis 510, represents an impermissible check. Certain types of checks may be designated by a bank as not acceptable for a remote deposit process. For example, some banks may chose not to accept money orders by remote deposit. Check 502 may pass certain computer vision analytics, such as, but not limited to, size (e.g., shown as "2.75×6 inches", as well as other characteristics not shown, such as, but not limited to, color, ink quality, fonts, perforated edge. In addition, an OCR of the check may produce an expected number (e.g., shown as 12) and content of extracted data fields. However, an OCR of the check may also generate a MICR data field that includes a known money order routing or account number and therefore, in the situation where a bank does not allow money orders to be remote deposited, would pass the threshold for an impermissible check. While described for money orders, any known or future check type, designated by a receiver of the deposit as impermissible, may be substituted therefore without departing from the scope of the technology disclosed herein. Impermissible check types may be stored in an updateable look-up table (LUT) in local or remote computer memory.

In another non-limiting example, check 504 with analysis 512, represents a permissible check. Checks, based on type (e.g., personal, business, payroll, etc.), may include standardized sizing ranges for types of checks designated by a bank to be permissible for a remote deposit process. In this example, check 504 falls within an expected size range for a specified check type (e.g., shown as "3.5×8 inches"). In addition, the check includes an expected number of data fields (e.g., shown as 12) for the specified check type (e.g., business or personal) and therefore does not exceed an impermissible check threshold score.

In another non-limiting example, check 506 with analysis 514, represents a permissible check. Payroll checks may include standardized sizing and data field ranges for checks designated by a bank to be permissible for a remote deposit process. In this example, check 506 falls within an expected size range for a specified check type (e.g., shown as "9 3/16×13 inches"). In addition, the check includes an expected number of data fields (e.g., shown as 19) for a payroll check and therefore does not exceed an impermissible check threshold score. Payroll checks may also be checked for a standard two-section format.

In a non-limiting example, check 508 with analysis 516, represents an impermissible check. Personal checks may include standardized sizing ranges. For example, according to ANSI, the standard check size must be at least 6 inches in the width and it cannot exceed 8.75 inches. The height of the check must also be between 2.75 and 3.66 inches. Check 508 falls outside an expected size range as its width is limited to 3.5 inches. In another non-limiting example, check 508 also includes less data fields (e.g., shown as 7) than expected for personal checks and therefore would fail check processing. In yet another non-limiting example, the personal check, if printed by the user may contain impermissible fonts, colors, or lack a perforated edge, to name a few example impermissible characteristics.

FIG. 6 illustrates a block diagram of a ML system, according to some embodiments and aspects. The implementation 600 may include one or more system servers processing various banking deposit operations in a secure closed loop. While described for a mobile computing device, desktop solutions may be substituted without departing from the scope of the technology described herein. These system servers may operate to support mobile computing devices from the cloud. It is noted that the structural and functional aspects of the system servers may wholly or partially exist in the same or different ones of the system servers or on the mobile device itself. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order, as will be understood by a person of ordinary skill in the art.

In some aspects, an impermissible check model 310 may be processed locally on the client device 302 to improve remote pre-deposit performance, such as accuracy, quality and speed, to name a few. In various aspects, impermissible check model 310 may be a standalone model or be integrated within mobile banking app 304. Check images 604 may be processed by the impermissible check model 310 to predict formulations of impermissible check scores, optimized check image selections, and optimum assignments to individual image frames that would achieve a quality check image for image processing purposes. An impermissible check scores threshold may be calculated based on a severity index of impermissible characteristics or combination of characteristics.

As previously disclosed, the impermissible check model 310 may process extracted data fields, computer vision processed check characteristics, or both. In some embodiments, the impermissible check model 310 may be trained as two or more separate models, 620 (1-N)-one for processing the extracted data fields and one for processing the computer vision check characteristic data inputs. Alternatively, or in addition to, the impermissible check model 310 may be trained as a composite model that may process both the extracted data fields and check characteristics. Training may include exposing the ML models 620 to hundreds, thousands, or more of historical composite images 626 from previous deposits, where specific impermissible check scores, a number of impermissible checks score threshold ranges, and corresponding check characteristics that affect the score are included as metadata with the composite images. Check characteristics 624 may be selectable and varied during the training process to generate an optimized threshold based on a historical correlation with impermissible check score thresholds (or range of scores). ML models 620 may each have varied parameter weightings, performance weightings, or quality weightings, but are not limited to these parameter weightings. One skilled in ML would appreciate that any of the parameters or characteristics used in the impermissible check scoring, such as, but not limited to, size, data fields, etc., may have weighting varied without departing from the scope of the technology disclosed herein.

Machine learning may involve computers learning from data provided so that they carry out certain tasks. For more advanced tasks, it can be challenging for a human to manually create the needed algorithms. This may be especially true of teaching approaches to correctly identify patterns. The discipline of machine learning therefore employs various approaches to teach computers to accomplish tasks where no fully satisfactory algorithm is available. In cases where vast numbers of potential answers exist, one approach, supervised learning, is to label some of the correct answers as valid or successful. For example, a previously determined impermissible check may be correlated with an impermissible check score. This may then be used as training data for the computer to improve the algorithm(s) it uses to determine future successful outcomes.

The predictive models 620 (e.g., 1-N) may classify customer's historic transaction image data based on a positive result of a check clearing the user's account or by negative labels (e.g., bad check was accepted for deposit, etc.) against the trained predictive model to predict successful detection of impermissible checks and generate or enhance a previous generated model. In one embodiment, the ML models (e.g., models 620, 1-N) are continuously updated as new user financial interactions occur.

Images received from the client device, including the check images used in the computer vision or OCR process, may be stored in the User Account DB 608. User Account DB 608 may also store user profile information that may be used with the cloud banking system 316 to provide account and profile information based on associated identifiers (IDs). Additionally, as specific funds are released, this historical information may be added to the user's profile and further be stored in the User Account DB 608.

As shown, a series of desired models 620, 1-N, may be fed into the ML Engine 618 as predictor models to select a model that may result in optimum detection of impermissible checks. The model(s) 620 may be trained and continuously improved by analyzing relative success over a large data set, where success is measured by checks successfully clearing the account. ML models 620 may be focused to generate queries for a specific performance level, for example, 100% of impermissible checks rejected.

Alternatively, or in addition to, one or more components of the ML platform 329 may be implemented within the user's mobile device, third party platforms, and a cloud-based system or distributed across multiple computer-based systems.

Figure 7:
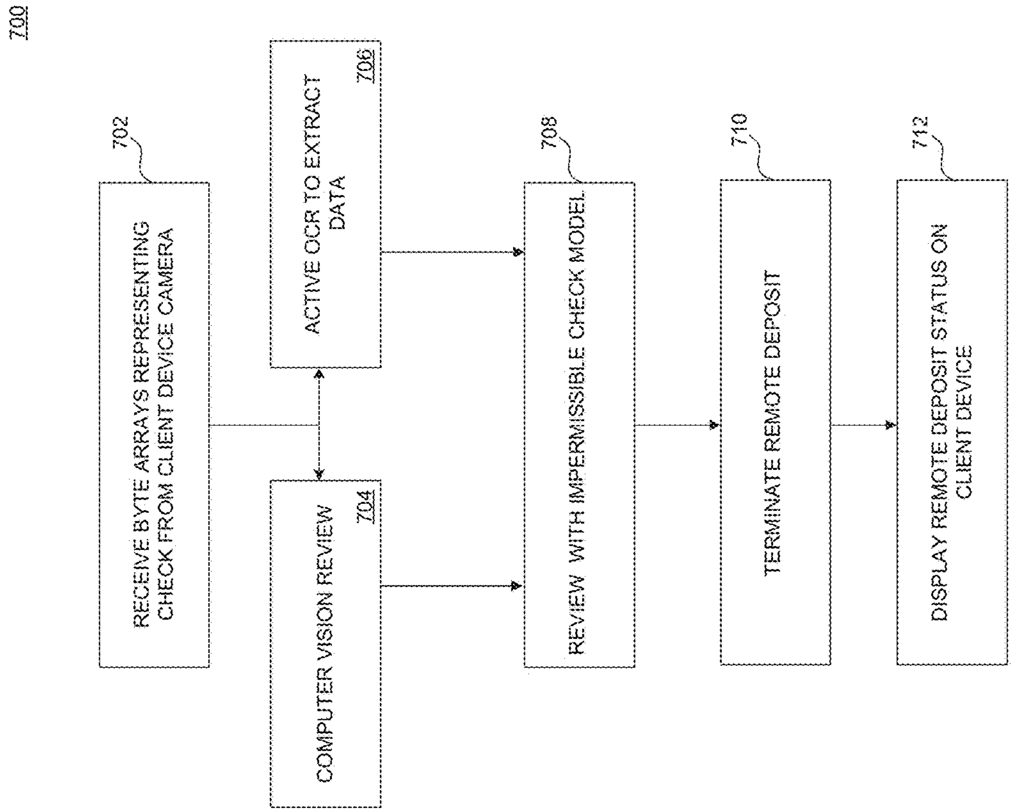
FIG. 7 illustrates a flow diagram for a remote deposit system, according to embodiments and aspects.

FIG. 7 is a flow chart 700 depicting a remote check deposit method that can be carried out in line with the discussion above. One or more of the operations in the method depicted by FIG. 7 could be carried out by one or more entities, including, without limitation, client device 302, cloud banking system 316, or other server or cloud-based server processing systems and/or one or more entities operating on behalf of or in cooperation with these or other entities. Any such entity could embody a computing system, such as a programmed processing unit or the like, configured to carry out one or more of the method operations. Further, a non-transitory data storage (e.g., disc storage, flash storage, or other computer readable medium) could have stored thereon instructions executable by a processing unit to carry out the various depicted operations. In some aspects, the systems described generate and instantiate an impermissible check model process for a remote check deposit.

In 702, a banking app 402 instantiates a remote deposit by activating a client device 302 camera. For example, a customer of a mobile computing device, operating a mobile banking app, initiates a remote deposit by selecting this option on a UI of the banking mobile app on their mobile computing device. This selection provides instructions to the camera to communicate image data from the field of view of the camera. In one aspect, the image data is communicated as a raw live image stream to a resident or remote computer vision system 410 and/or a real-time active OCR system 314. In one aspect, the raw live image stream is first converted to a byte array and then communicated as a live byte array stream. In one aspect, the image data is continuously communicated to the computer vision system 410 and/or a real-time active OCR system 314. In another aspect, the image data is buffered before or during communication to adjust for processing bandwidth or discrete stages of image processing (e.g., size determination, specific data field extraction, etc.)

In 704, an image processor, resident on the client device 302, or remotely located on a remote server (e.g., cloud banking system 316), implements computer vision algorithms to detect visible check irregularities. For example, a personal check may be expected to be in a standardized size of 2.75 by 6 inches, be perforated along at least one edge and be consistent with a check provider's paper quality (e.g., density and smoothness), fonts and color palette. One or more computer vision algorithms, implemented by the image processer, may determine sizing of a check based on a detected outside edge, border or relative data field position. In addition, the computer vision algorithms may detect various physical attributes of the check, such as, but not limited to, border detection, colors, fonts, resolution, inks, watermarks, paper quality, etc.

In 706, OCR system 314 performs localized OCR on the received live image stream. OCR is performed on a live imagery stream during a current customer transaction time period. For example, an "active" OCR process is completed before finalization of a remote deposit operation. In one aspect, a ML model, previously trained on other OCR transactions, improves a standard active OCR process by intelligently extracting data based on an historical understanding of previously successful or failed active OCR transactions.

In 708, an impermissible check model 310 processes one or more of the computer visions data or OCR data to detect if a check meets or exceeds a selectable score threshold (e.g., 85% surety). In some embodiments, client device 302 communicates the results of the impermissibility check to a cloud banking system 316.

In 710, the status of the remote deposit may be changed from active to paused or terminated based on the results of the impermissible check model 310 as it moves from initiation to completion.

In 712, the client device 302 displays the status of the remote deposit. For example, a terminated status is communicated to and rendered on-screen of a customer's device within one or more customer interfaces (UIs) of the customer device's mobile banking app. The UI may instantiate the status of the remote deposit as images, graphics, audio, additional content, etc.

In some aspects, the completion of the remote deposit operation reflects a successful outcome, while a cancellation reflects a failed outcome. In some aspects, customer behavior, not limited to success/failure, may be fed back to the ML learning platform 329 to enhance future training of the ML models. For example, in some embodiments, one or more inputs to the ML funding models may be weighted differently (higher or lower) to effect a predicted higher successful outcome.

The solutions described above join several key technical components that are lacking in the current remote deposit funding alerts. The various aspects solve at least the technical problems associated with pre-deposit detection of impermissible checks, without communication to a remote banking system. The various embodiments and aspects described by the technology disclosed herein are able to provide check image processing operations and remote deposit status determinations mid-experience, before the customer completes the deposit.

Example Computer System

Figure 8:
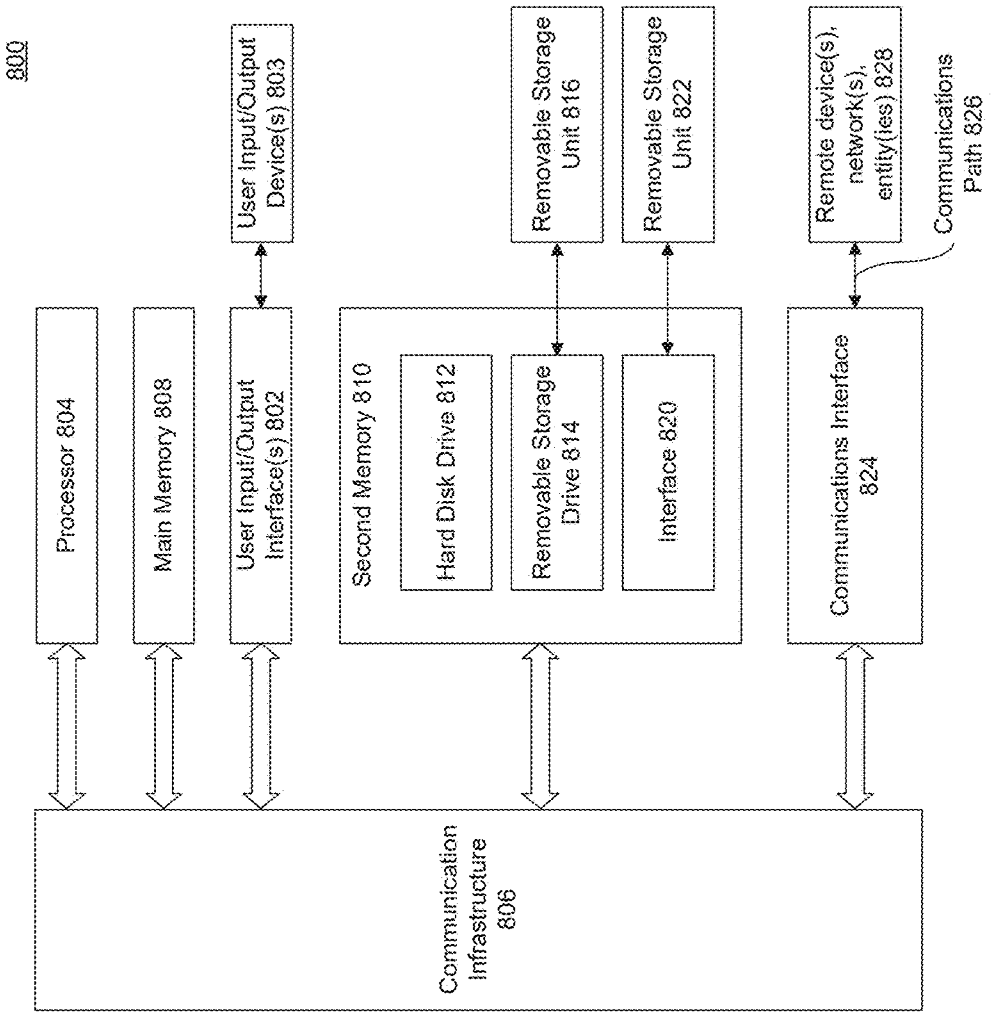
FIG. 8 illustrates an example computer system useful for implementing various embodiments and aspects.

FIG. 8 depicts an example computer system useful for implementing various embodiments.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof. For example, the example computer system may be implemented as part of mobile computing device 102, client device 302, cloud banking system 316, etc. Cloud implementations may include one or more of the example computer systems operating locally or distributed across one or more server sites.

Computer system 800 may include one or more processors (also called central processing units, or CPUs), such as a processor 804. Processor 804 may be connected to a communication infrastructure or bus 806.

Computer system 800 may also include customer input/output device(s) 802, such as monitors, keyboards, pointing devices, etc., which may communicate with communication infrastructure 806 through customer input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 816. Removable storage unit 816 may include a computer usable or readable storage device having stored thereon computer software (control logic) and/or data. Removable storage unit 816 may be a floppy disk, magnetic tape, compact disk, DVD, optical storage disk, and/any other computer data storage device. Removable storage drive 814 may read from and/or write to removable storage unit 816.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML Customer Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 816 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method for a remote deposit environment, comprising:

activating, on a client device, a financial application, wherein the financial application is configured to instantiate a customer interface (UI) on the client device;

receiving a customer request, based on interactions with the UI, to electronically deposit a financial instrument;

based on the customer request, generating a raw live stream of image data of a field of view of at least one camera, wherein the raw live stream of image data includes imagery of at least a portion of the financial instrument;

extracting a plurality of data fields of the financial instrument from the raw live stream;

providing, as an input to a machine learning model (ML), the plurality of data fields;

determining, by the ML model, an impermissibility score of the financial instrument based at least on the plurality of data fields; and based on exceeding a selectable threshold of the impermissibility score, modifying a status of the remote deposit to pause or terminate the remote deposit.

2. The computer-implemented method of claim 1, wherein the plurality of data fields is extracted by an active optical character recognition process.

3. The computer-implemented method of claim 1, further comprising processing, by computer vision algorithms, the raw live stream of image data to extract visible characteristics of the financial instrument.

4. The computer-implemented method of claim 3, further comprising communicating the extracted visible characteristics of the financial instrument to the ML model to determine the impermissibility score of the financial instrument.

5. The computer-implemented method of claim 1, wherein the impermissibility score of the financial instrument is based on assigning severity index scores to impermissible characteristics of the financial instrument.

6. The computer-implemented method of claim 5, wherein the impermissibility score of the financial instrument is based on any of: aggregating, averaging, or a mean derivation of the assigned severity index scores.

7. The computer-implemented method of claim 5, wherein the impermissible characteristics of the financial instrument include any of: visible physical characteristics, data fields, placement of data fields, or detected content.

8. The computer-implemented method of claim 1, wherein the client device is a mobile client device.

9. A system, comprising:

a memory; and at least one processor coupled to the memory and configured to:

activate, on a client device, a financial application, wherein the financial application is configured to instantiate a customer interface (UI) on the client device;

receive a customer request, based on interactions with the UI, to electronically deposit a financial instrument;

based on the customer request, generate a raw live stream of image data of a field of view of at least one camera, wherein the raw live stream includes imagery of at least a portion of the financial instrument;

extract a plurality of data fields of the financial instrument from the raw live stream;

provide, as an input to a machine learning model (ML), the plurality of data fields;

determine, by the ML model, an impermissibility score of the financial instrument based at least on the plurality of data fields; and based on exceeding a selectable threshold of the impermissibility score, modify a status of a remote deposit to pause or terminate the remote deposit.

10. The system of claim 9, wherein the plurality of data fields is extracted by an active optical character recognition process.

11. The system of claim 10, wherein the at least one processor is further configured to process, by computer vision algorithms, the raw live stream of image data to extract visible characteristics of the financial instrument.

12. The system of claim 11, wherein the at least one processor is further configured to communicate the extracted visible characteristics, of the financial instrument, to the ML model to determine the impermissibility score of the financial instrument.

13. The system of claim 12, wherein the at least one processor is further configured to determine the impermissibility score based on assigning severity index scores to the plurality of data fields or the visible characteristics of the financial instrument.

14. The system of claim 9, wherein the client device is a mobile client device.

15. A non-transitory computer-readable device having instructions stored thereon that, when executed by at least one computing device, cause the at least one computing device to perform operations comprising:

activating, on a client device, a financial application, wherein the financial application is configured to instantiate a customer interface (UI) on the client device;

receiving a customer request, based on interactions with the UI, to electronically deposit a financial instrument;

based on the customer request, generating a raw live stream of image data of a field of view of at least one camera, wherein the raw live stream of image data includes imagery of at least a portion of the financial instrument;

extracting a plurality of data fields of the financial instrument from the raw live stream;

providing, as an input to a machine learning model (ML), the plurality of data fields;

determining, by the ML model, an impermissibility score of the financial instrument based at least on the plurality of data fields; and based on exceeding a selectable threshold of the impermissibility score, modifying a status of a remote deposit to pause or terminate the remote deposit.

16. The non-transitory computer-readable device of claim 15, wherein the plurality of data fields is extracted by an active optical character recognition process.

17. The non-transitory computer-readable device of claim 16, further comprising operations to extract, by computer vision algorithms, visible characteristics of the financial instrument from the raw live stream of image data.

18. The non-transitory computer-readable device of claim 17, further comprising operations to communicate the extracted visible characteristics of the financial instrument to the ML model to determine the impermissibility score of the financial instrument.

19. The non-transitory computer-readable device of claim 15, further comprising operations to determine the impermissibility score, based on assigning severity index scores to impermissible characteristics of the financial instrument.

20. The non-transitory computer-readable device of claim 15, wherein the client device is a mobile client device.

* * * * *